(12) United States Patent
Bromberg et al.

(10) Patent No.: US 10,146,434 B1
(45) Date of Patent: Dec. 4, 2018

(54) FIFO SYSTEMS AND METHODS FOR PROVIDING ACCESS TO A MEMORY SHARED BY MULTIPLE DEVICES

(71) Applicant: Marvell Israel (M.I.S.L) Ltd., Yokneam (IL)

(72) Inventors: Dror Bromberg, Michmoret (IL); Roi Sherman, Yokneam (IL)

(73) Assignee: Marvell Israel (M.I.S.L) Ltd, Yokneam (IL)

( * ) Notice: Subject to any disclaimer, the term of this patent is extended or adjusted under 35 U.S.C. 154(b) by 117 days.

(21) Appl. No.: 15/150,931

(22) Filed: May 10, 2016

Related U.S. Application Data (60) Provisional application No. 62/162,038, filed on May 15, 2015.

(51) Int. Cl.
| | |
|---|---|
| *G06F 13/00* | (2006.01) |
| *G06F 3/06* | (2006.01) |
| *H04L 12/879* | (2013.01) |
| *H04L 29/08* | (2006.01) |
| *G06F 12/0871* | (2016.01) |

(52) U.S. Cl.
CPC .......... *G06F 3/0605* (2013.01); *G06F 3/0631* (2013.01); *G06F 3/0637* (2013.01); *G06F 3/0656* (2013.01); *G06F 3/0683* (2013.01); *G06F 12/0871* (2013.01); *H04L 49/901* (2013.01); *H04L 67/2842* (2013.01)

(58) Field of Classification Search
CPC .... G06F 3/0605; G06F 3/0631; G06F 3/0637; G06F 3/0656; G06F 3/0683; G06F 12/0871; H04L 49/901; H04L 67/2842
See application file for complete search history.

(56) References Cited

U.S. PATENT DOCUMENTS

| | | | | |
|---|---|---|---|---|
| 7,254,677 B1* | 8/2007 | Lowe | ........................ | G06F 5/10 710/52 |
| 2005/0138326 A1* | 6/2005 | Terada | ................ | G06F 9/30181 712/22 |
| 2009/0125644 A1* | 5/2009 | Yokoyama | ............. | G03B 17/00 710/11 |
| 2012/0079174 A1* | 3/2012 | Nellans | ................ | G06F 12/0246 711/103 |
| 2015/0095622 A1* | 4/2015 | Yoshida | .................... | G06F 9/52 712/221 |
| 2016/0026436 A1* | 1/2016 | Shen | ........................ | G06F 5/14 712/43 |

* cited by examiner

*Primary Examiner* — Charles Rones
*Assistant Examiner* — Han Doan (57) ABSTRACT

A First-In-First-Out (FIFO) system and a method for providing access to a memory shared by a plurality of N clients are provided. The memory has a single memory space for holding a plurality of data storage arrays that are respectively configured to store data in a first-in-first-out manner for corresponding clients among the N clients. An arbiter is configured to receive memory access requests from two or more of the N clients to perform a FIFO operation, to push data into a corresponding storage array or to pop data from the corresponding storage array in response to the memory access request. The arbiter is configured to select a first at least one of the clients to perform a first FIFO operation in a first memory operation cycle and to select a second at least one of the clients to perform a second FIFO operation in a second memory operation cycle.

21 Claims, 5 Drawing Sheets

FIFO SYSTEMS AND METHODS FOR PROVIDING ACCESS TO A MEMORY SHARED BY MULTIPLE DEVICES

CROSS-REFERENCE TO RELATED APPLICATIONS

This application claims priority to U.S. Provisional Patent Application No. 62/162,038, filed May 14, 2015, entitled "Shared FIFO," which is incorporated herein by reference in its entirety.

FIELD

The technology described herein relates generally to computing systems and more particularly to systems and methods for providing access to a memory shared by multiple devices.

BACKGROUND

In some computing systems, access to a system resource is shared by multiple devices. For example, a system bus is an example of a shared resource that is utilized by multiple different devices or components of a computing system. In some computing systems, the shared resource can be utilized by only one of the competing devices at any given time. Therefore, some scheme must be employed to grant authority to use the shared resource when multiple simultaneous requests occur. In modern computing systems, it is a typical design requirement not to allow one particular device at a time to dominate a shared resource.

The description above is presented as a general overview of related art in this field and should not be construed as an admission that any of the information it contains constitutes prior art against the present patent application.

SUMMARY

Examples of a First-In-First-Out (FIFO) system and a method for providing access to a memory shared by multiple clients are provided. An example FIFO system includes a plurality of N clients, ones of the N clients requiring access to a FIFO buffer. The FIFO system also includes a memory shared by the N clients. The memory has a single memory space for holding a plurality of data storage arrays that are respectively configured to store data in a first-in-first-out manner for corresponding clients among the N clients. A number of ports of the memory is less than the N number of clients sharing the memory. The FIFO system also includes an arbiter configured to receive memory access requests from two or more of the N clients to perform a FIFO operation, to push data into a corresponding storage array or to pop data from the corresponding storage array in response to the memory access request. The arbiter is configured to select a first at least one of the clients to perform a first FIFO operation in a first memory operation cycle and to select a second at least one of the clients to perform a second FIFO operation in a second memory operation cycle subsequent to the first memory operation cycle.

In an example method for providing access to a memory shared by multiple clients, portions of a single shared memory are allocated to a plurality of N clients. Ones of the portions include a data storage array formed therein, the data storage arrays being respectively configured to store data in a first-in-first-out manner for corresponding clients among the N clients. A number of ports of the single memory is less than the N number of clients sharing the memory. Requests are received from two or more of the N clients to perform a FIFO operation to push data into a corresponding storage array or to pop data from the corresponding storage array. A first at least one of the clients is selected to perform a first FIFO operation in a first memory operation cycle. A second at least one of the clients is selected to perform a second FIFO operation in a second memory operation cycle subsequent to the first memory operation cycle.

DETAILED DESCRIPTION

Figure 1:
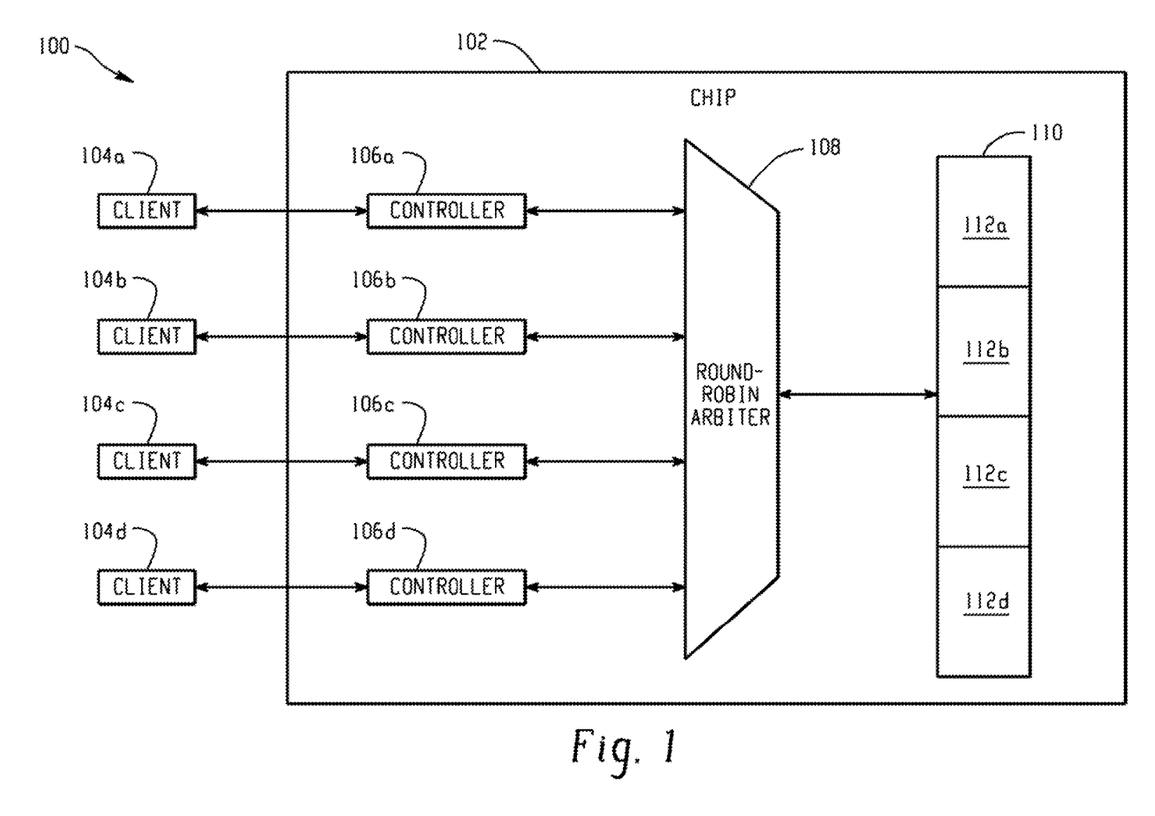
FIG. 1 depicts an example system for providing access to a memory shared by multiple clients, according to an embodiment.

FIG. 1 depicts an example system 100 for providing access to a memory shared by multiple clients 104, according to an embodiment. In the example of FIG. 1, the system 100 includes a single memory 110 that is shared by the multiple clients 104, an arbiter 108, and multiple controllers 106, where each of the controllers 106 is coupled to a corresponding client of the clients 104. Although the example of FIG. 1 shows the system 100 as being coupled to four clients 104a-104d, it is noted that in various other embodiments, the system 100 is coupled to any suitable number of clients 104. According to various embodiments, the arbiter 108 manages access of the plurality of clients 104 to the memory 110. In some embodiments, the plurality of clients 104 include any devices, components, elements, etc. (e.g., processing units) for which access to the memory 110 is required or desired. The memory 110 has a single memory space for holding a plurality of data storage arrays that are respectively configured to store data in a first-in-first-out manner for corresponding clients among the clients 104a-104d, in embodiments. As discussed in greater detail below, in some examples, the memory 110 comprises a single memory space that is shared among the plurality of clients, in which a plurality of queues (e.g., FIFO queues) is formed therein. In these examples, each of the clients 104 is associated with a respective queue of the plurality of queues, and the arbiter 108 manages access of the clients 104 to their respective queues formed in the memory 110.

According to various embodiments, the controllers 106, arbiter 108, and memory 110 are implemented on a single chip 102 (i.e., a single die, a single integrated circuit). However this need not be the case inasmuch as the controllers 106 and arbiter 108 may be disposed on different chips than the memory 110, in an embodiment. The chip 102 comprises a portion of a network device configured to selectively transmit packets on a network, in embodiments. Thus, in examples, the memory 110 comprises a memory disposed on the single chip 102 used in a network switching device (e.g., an Ethernet switch). In the example of FIG. 1, the clients 104 are not disposed on the single chip 102, but in other examples, the clients 104 are implemented on the single chip 102. In some embodiments, the plurality of clients 104 comprise, for example, a plurality of packet processing cores of a network switching device. In some embodiments, the chip 102 comprises a portion of a network device that is used in a packet switching network to forward data packets from a source to a destination (e.g., a switch, router, VPN concentrator, etc.). In operation, such a network device processes one or more data flows (e.g., one or more packet streams) that traverse the network device. In an embodiment, a data flow corresponds to a sequence of data units received by the network device via a particular originating device or network. In the example of FIG. 1, the clients 104 may comprise such originating devices or networks, such that the clients are sources of the data flows. Typically, an order of data units in a data flow is maintained by the network device. To maintain the order of data units within respective data flows, the chip 102 includes the shared memory 110 with multiple queues (e.g., FIFO queues) formed therein. In examples, each queue of the plurality of queues is associated with a particular client of the clients 104 from which the data flow originated.

In still further embodiments, the plurality of clients 104 comprise any other suitable components for which shared access to the memory 110 is required or desired. For example, in some embodiments, the plurality of clients 104 comprise components of a device other than a network switching device. In one such example, the plurality of clients 104 comprise a plurality of cores of a multi-core processor implemented as part of a general purpose computing device, and the memory 110 comprises a single memory that is shared by the plurality of processor cores. Additional example implementations of the plurality of clients 104 and the shared memory 110 are described in further detail below.

In the system of FIG. 1, the memory 110 that is shared by the multiple clients 104 includes multiple portions 112. Each of the portions 112 is allocated to a respective client of the multiple clients 104. Thus, for instance, a portion 112a of the memory 110 is allocated to the client 104a, a portion 112b of the memory 110 is allocated to the client 104b, and so on. In some embodiments, each of the portions 112 of the memory 110 includes a queue for a respective client of the clients 104. Such queues are described in further detail below with reference to FIGS. 2A-2C. In embodiments, each of the portions 112 includes a single queue for a respective client of the clients 104, and in other embodiments, each of the portions 112 includes several queues for a respective client of the clients 104. It is noted that in embodiments, the memory 110 comprises a single, shared memory and does not include multiple different memories. In these embodiments, each of the portions 112 thus comprises a portion of the single memory 110, and the portions 112 are not multiple, separate memories. As described in further detail below, the use of multiple, separate memories is inefficient in terms of area and power consumption. The single, shared memory 110, as utilized in embodiments described herein, avoids such inefficiencies.

It is noted that in embodiments, the portions 112 are not physical portions of the memory 110 allocated to the respective clients, but are instead "virtual" portions of the memory 110. In such embodiments, the allocation of memory space to the clients 104 is a virtual allocation of space (e.g., in which each client is given a percentage of the memory space) and not a physical allocation (e.g., a physical partitioning) of space. A virtual portion 112 of the memory 110 for a given client comprises various locations throughout the memory 110, in embodiments, and is not necessarily confined to a specific physical area of the memory 110 allocated to the client. Accordingly, in embodiments, a queue for a given client formed in the client's virtual portion 112 includes data stored at various locations throughout the memory 110, and the data is not confined to a specific physical area of the memory 110. In such embodiments, physical space occupied by the queue for the given client is "interwoven" with physical space occupied by queues for the other clients. In other embodiments, the portions 112 are physical partitions of the memory 110 allocated to the respective clients. In such embodiments, the clients 104 are allocated specific physical areas of the memory 110, and the queue for a given client is formed within a physical partition of the memory 104 allocated to the client.

As described above, the system of FIG. 1 includes multiple controllers 106, where each of the controllers 106 is coupled to a corresponding client of the clients 104. In embodiments, each of the controllers 106 is configured to assert request signals on behalf of its corresponding client 104. The request signals are asserted in response to read and write commands received from the clients. Thus, for instance, the client 104a transmits a read command to the controller 106a, with the read command requesting to read data from the portion 112a of the memory 110 allocated to the client 104a. Based on its receipt of this read command, the controller 106a asserts a request signal, which in accordance with an embodiment, requests access (e.g., read access) to the portion 112a on behalf of the client 104a. In embodiments, the request signal specifically requests to pop data from (e.g., read data from) the queue of the client 104a formed in the portion 112a. Likewise, for instance, if the client 104a transmits a write command to the controller 106a, requesting to write data to the portion 112a, the controller 106a subsequently asserts a request signal requesting access (e.g., write access) to the portion 112a on behalf of the client 104a. In embodiments, the request signal specifically requests to push data to (e.g., write data to) the queue of the client 104a formed in the portion 112a.

In some embodiments, the controllers 106 do not assert request signals immediately upon receiving read and write commands from corresponding clients 104. In some of these embodiments, each of the controllers 106 has a cache that includes multiple cache lines. A client 104 seeking to write data to its portion 112 of the memory 110 writes data into a cache line of a cache of its corresponding controller 106. The controller 106 asserts a write request signal on behalf of the client 104 only after the cache line is full. Likewise, a client 104 seeking to read data from its portion 112 of the memory 110 may read data from a cache line of a cache of its corresponding controller 106. The controller 106 asserts a read request signal on behalf of the client 104 only after the cache line is empty. These embodiments are described in further detail below with reference to FIGS. 2A-2C.

The request signals asserted by the controllers 106 on behalf of the clients 104 are received at the arbiter 108. The shared memory 110 has a number of ports that is less than the N number of clients 104 sharing the memory 110, and thus, the arbiter 108 is configured to manage access of the plurality of clients 104 to the memory 110. In embodiments, the arbiter 108 grants access to the memory 110 to the clients 104 having request signals asserted in a sequential order. For instance, the arbiter 108 implements "round robin" access of the plurality of clients 104 to the shared memory 110, in embodiments, where the clients 104 having request signals asserted are served in turn according to a selection sequence. For instance, if all four of the clients 104a, 104b, 104c, 104d have request signals asserted on behalf of them by their respective controllers 106a, 106b, 106c, 106d, an example selection sequence includes the client 104a, followed by the client 104b, followed by the client 104c, followed by the client 104d until all of the requests are served. In some embodiments, the selection sequence repeats itself once, more than once, or indefinitely, e.g., after the client 104d, the next client in the selection sequence is the client 104a, followed by the client 104b, etc.

The selection sequence proceeds in any suitable manner according to various embodiments, including embodiments where the selection sequence includes the clients 104a-104d in any other suitable order and embodiments where the plurality of clients 104 include more than four clients or less than four clients. In some cases where one or more of the plurality of clients do not request access to the shared memory 110 (e.g., do not have request signals asserted by corresponding controllers 106), the arbiter 108 redefines the selection sequence accordingly. In one embodiment, the arbiter 108 defines the selection sequence based on the request signals that are received from the controllers 106. Thus, for instance, if only the clients 104a and 104b have request signals asserted by their respective controllers 106a and 106b at a particular time, the arbiter 108 receives the request signals and consequently defines the selection sequence to include, for example, the client 104a followed by the client 104b.

In granting access to the clients 104 having request signals asserted in the sequential order, the arbiter 108 grants each client 104 access to the memory 110 for only a single clock cycle at a time, in an embodiment. Thus, for instance, in the example above where the arbiter 108 grants access to all four clients 104a-104d according to the selection sequence that includes the client 104a, followed by the client 104b, followed by the client 104c, followed by the client 104d, each of the four clients is granted access for only a single clock cycle at a time. Thus, according to the sequential order of the selection sequence, the client 104a is granted access during a first clock cycle, the client 104b is then granted access during a subsequent second clock cycle, and so on.

By granting each client 104 access for a single clock cycle at a time, the arbiter 108 ensures that each client 104 requesting access to the memory 110 is granted access at least once every N clock cycles, where N is equal to the number of clients 104. Thus, in the example of FIG. 1, N=4, such that each of the clients 104 is guaranteed access to the memory 110 at least once every four clock cycles. If less than all N clients 104 are requesting access to the memory 110, then the clients requesting access are granted access at a rate that is greater than the minimum rate of at least one access every N clock cycles. Thus, for instance, if only the clients 104a and 104b have request signals asserted by their respective controllers 106a and 106b at a particular time, the clients 104a and 104b are granted access to the memory 110 every other clock cycle.

As noted above, the memory 110 has a number of ports that is less than the N number of clients 104 sharing the memory 110. If the memory 110 is a single-port memory, when a client 104 is granted access for a single clock cycle, the client 104 can perform a read operation or a write operation during the clock cycle, in embodiments. If the memory 110 is a dual-port (i.e., two-port) memory, when a client 104 is granted access for a single clock cycle, the client 104 can perform a read operation, a write operation, or both read and write operations during the clock cycle.

In embodiments, the shared memory 110 is a static random access memory (SRAM) memory having a single memory space. As described above, the memory 110 holds a plurality of data storage arrays (e.g., FIFO queues) that are respectively configured to store data in a FIFO manner for corresponding clients among the N clients 104a-104d. The FIFO controllers 106 are configured to control the N clients' access to their corresponding data storage arrays, with each of the FIFO controllers 106 corresponding to a respective data storage array of the plurality of data storage arrays, in embodiments. In some embodiments, the FIFO controllers 106 are configured to define one or more dimensions of their corresponding data storage arrays. For instance, if the controllers 106 support incremental addresses only, then sizes (e.g., a number of memory lines) of the data storage arrays are statically determined based on the respective needs and/or applications of the individual clients 104a-104d. For example, if there are four clients, with one client having a 1 Gbps port, one client having a 10 Gbps port, one client having a 40 Gbps port, and one client having a 100 Gbps port, then the FIFO controllers 106 allocate memory sizes to the four clients based on the respective speeds of the clients' ports (e.g., the client having the 100 Gbps port is given 100 times the amount of memory that the client having the 1 Gbps port is given, and so on). In embodiments, if there are four clients, then a sum of the memory sizes given to the four clients is equal to a total size of the memory 110.

When the sizes of the data storage arrays are statically determined, in embodiments, each client is given a fixed size (e.g., a fixed percentage) of the memory 110. When traffic is written and read from the FIFO queues, the fixed sizes given to the clients cannot be changed (e.g., the configuration cannot be changed under traffic). Thus, if a client is given a certain size of the shared memory 110 and that client does not have data to be written to its FIFO queue, then that size of the memory 110 is not used, such that it is effectively wasted. When the controllers 106 support incremental addresses only, in embodiments, if the memory data width is 4 bytes wide, for example, then the memory address is an increment of 4 bytes. Thus, for instance, an address of a first memory line is 0x0, an address of a second memory line is 0x4, an address of a third memory line is 0x8, an address of a fourth memory line is 0xc, and so on.

If the controllers 106 support non-incremental addresses, then sizes of the data storage arrays can be changed by the controllers 106 dynamically. For example, if a queue for a client 104a becomes full, the controller 106a can increase the relative size of the client's queue at the expense of other queues formed in the memory 110. In examples, each of the controllers 106 maintains a fill level, and each fill level is seen by all other controllers 106. When the fill level of one controller 106 becomes "full," the controller 106 chooses another controller 106 with a minimum fill level and "takes" from it a configurable amount of size. Thus, the controller 106 that had the full fill level becomes non-full and continues performing write commands. When the controllers 106 support non-incremental addresses, in embodiments, this means that a next address can "jump" to a new location. In the previous example describing the addresses of the first, second, third, and fourth memory lines, for instance, an address of a fifth memory line might be 0x20 instead of 0x10.

In conventional systems including multiple clients, it is typical for each client to have its own, separate memory. Thus, for a conventional system having four clients, for instance, four separate SRAM memories are used, with each client having unlimited access to its respective SRAM memory (e.g., each client need not share access to its respective memory with other clients). The conventional systems are deficient because the use of multiple, separate memories is inefficient in terms of area and power. In contrast to such conventional systems, the approaches of the instant disclosure utilize a single memory (e.g., a memory having a single memory space) that is shared by multiple clients. The single memory system is more efficient in terms of area and power than the conventional systems that utilize multiple, separate memories. The approaches of the instant disclosure thus enable lower power consumption and lower area requirements than the conventional systems. To enable the use of the single memory, the instant disclosure provides systems and methods for providing access to the single memory to multiple clients. Such systems and methods are described above with reference to FIG. 1 and in further detail below.

Figure 2A:
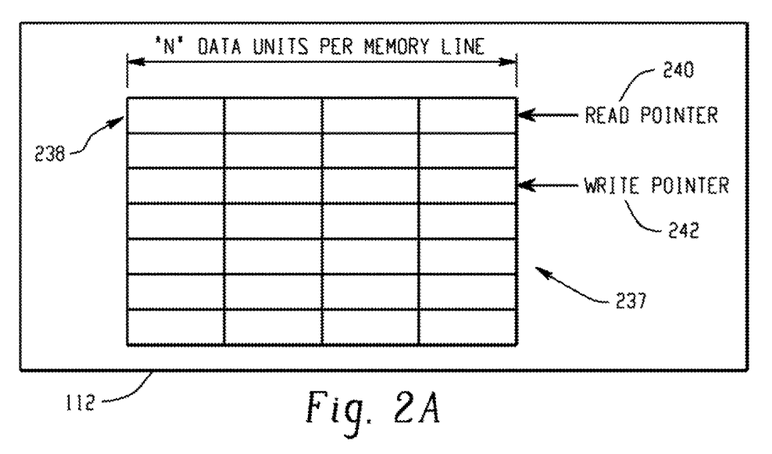
FIG. 2A depicts an example portion of the memory of FIG. 1, according to an embodiment.

FIG. 2A depicts an example portion 112 of the memory 110 of FIG. 1, according to an embodiment. As described above with reference to FIG. 1, the single shared memory 110 includes multiple portions 112, where each of the portions 112 is allocated to a respective client of the multiple clients 104. As noted above, in some embodiments, a portion 112 is a "virtual portion" of the memory 110 (e.g., a percentage of the total memory space given to a particular client, which may include memory locations located throughout the memory 110, with such memory locations not necessarily being confined to a specific physical area of the memory 110). Further, in some embodiments, a portion 112 is a "physical portion" (e.g., a physical partition of the memory 110 allocated to a particular client). In some embodiments, each of the portions 112 of the memory 110 includes a FIFO queue for a respective client of the clients 104. Thus, for instance, the client 104a shown in FIG. 1 is able to (i) pop data units from a FIFO queue formed in the client's memory portion 112a, and (ii) push data units into this queue. An example FIFO queue 237 formed in a portion 112 of the memory 110 is shown in FIG. 2A. The FIFO queue 237 is configured to store data in a first-in-first-out manner for a corresponding client of the clients 104.

In embodiments, the queue 237 includes a plurality of memory lines 238 for queuing data units in a predetermined order. Further, in embodiments, the FIFO queue 237 comprises a circular queue (i.e., a cyclic queue), such that upon reaching an end of the queue 237, read and write pointers to the queue 237 wrap around to the beginning of the queue 237. In some examples, a tail of the queue 237 is connected back to a head of the queue 237 via a linking indication (e.g., a pointer), such that read and write pointers to the queue 237 wrap around in the aforementioned manner. In embodiments, the queue 237 is a logical queue comprising one or more portions of the memory 110 that implement a queue data structure. Although embodiments described herein utilize queue data structures, it is noted that each of the portions 112 of the memory 110 stores data units in other suitable data storage arrays in other embodiments (e.g., linked list data structures, etc.). In some embodiments, the queues are hardware queues, but it is noted that the queues described herein are not limited to such hardware queues and comprise logical queues in embodiments, as described above. Systems and methods for providing the clients 104 read and write access to their respective queues 237 formed in the memory 110 are described in further detail below.

Figure 2B:
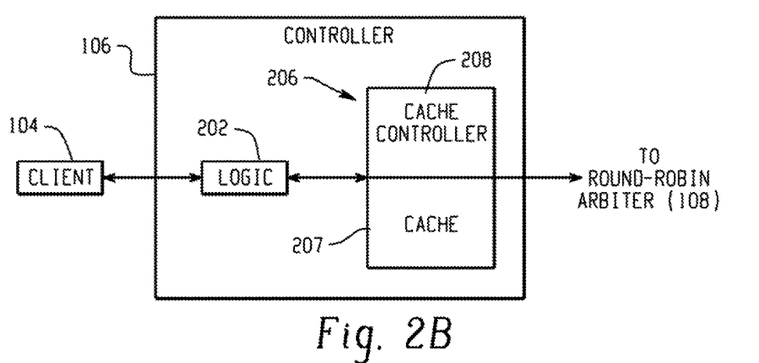
FIG. 2B depicts components of an example controller utilized in the system of FIG. 1, according to an embodiment.

FIG. 2B depicts components of an example controller 106 utilized in the system of FIG. 1, according to an embodiment. The systems described herein include multiple controllers 106 coupled to respective clients 104, where each of the controllers 106 is configured to assert request signals on behalf of its corresponding client 104. To provide this functionality, each controller 106 includes logic 202. In examples, the logic 202 is implemented in hardware, software, or some combination thereof. For instance, the logic 202 is implemented using one or more computer processors, computer logic, state machine(s), ASIC, FPGA, DSP, etc., in examples. When a client 104 wishes to write data units to the queue 237 formed in the portion 112 of the memory 110 allocated to the client 104, the client 104 transmits a write command to the controller 106. The write command is received at the logic 202. The write command further includes the data units that the client 104 wishes to write to the queue 237, in embodiments.

After receiving the write command, the logic 202 determines a write address in the memory 110 for writing the client's data units. In examples, the logic 202 determines the write address based on a write pointer (e.g., an input pointer) that is maintained (e.g., stored) by the logic 202, where the write pointer comprises an address of the memory 110. In embodiments, the write pointer points to a memory address corresponding to a particular memory line of the client's queue 237. An example write pointer 242 maintained by the logic 202 is shown in FIG. 2A. As seen in this figure, the write pointer 242 points to a particular memory line 238 of the client's queue 237. The logic 202 stores this write pointer 242 (e.g., in a register, memory, or other storage device of the logic 202), and after a given memory line 238 of the queue 237 is written to (e.g., such that the memory line 238 is full), the logic 202 increments the write pointer 242 to a next memory line 238 of the queue 237. In this manner, the logic 202 maintains an up-to-date write pointer 242 to the queue 237 at all times, thus enabling the logic 202 to determine a write address for writing data units to the queue 237 after receiving the write command from the client 104.

Figure 2C:
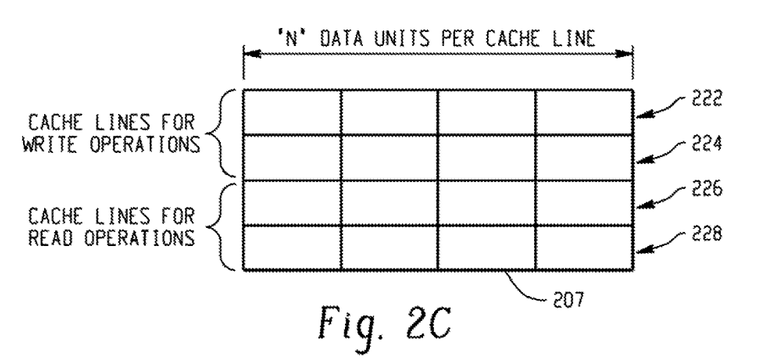
FIG. 2C depicts an example cache memory utilized in the controller of FIG. 2B, according to an embodiment.

With reference again to FIG. 2B, after the logic 202 determines the write address, the logic 202 transmits to a cache unit 206 (i) the write address, and (ii) the data units to be written to the queue 237. As illustrated in FIG. 2B, the cache unit 206 includes a cache memory 207 and a cache controller 208. To illustrate an example cache memory 207, reference is made to FIG. 2C. This figure depicts an example cache memory 207 utilized in the controller 106 of FIG. 2B, according to an embodiment. The cache memory 207 includes multiple cache lines 222, 224, 226, 228, with each of the cache lines being configured to store a maximum of N data units, where N is equal to the number of clients 104. Thus, for the example of FIG. 1, where there are four clients 104a, 104b, 104c, 104d, each of the cache lines 222, 224, 226, 228 can store a maximum of four data units, as shown in FIG. 2C.

In embodiments, the cache lines 222, 224 are allocated for write operations (i.e., operations in which data units are written from the client 104 to the memory 110), and the cache lines 226, 228 are allocated for read operations (i.e., operations in which data units stored in the memory 110 are read, such that the data units can be returned to the client 104). The use of the cache lines 222, 224, 226, 228 for performing these respective operations is described in further detail below. Each of the data units stored in the cache lines 222, 224, 226, 228 has a same, fixed size (e.g., 512 KB, etc.) and may also be known as a "data word." According to various embodiments, the cache memory 207 comprises different types of storage devices (e.g., SRAM, dynamic random access memory (DRAM), registers, flip-flops, etc.).

As described above, in performing a write operation for a client 104, the logic 202 transfers a write address and data units to the cache unit 206. The transferred data units are the data units received from the client 104, which the client 104 wishes to write to the queue 237 formed in the portion 112 of the memory 110 allocated to the client 104. The data units transferred to the cache unit 206 are stored in one of the two cache lines 222, 224 of the cache 207 that are allocated for write operations. The cache line used in storing these data units is a cache line that is not already full, in embodiments (e.g., if the cache line 222 already stores N data units, the data units subsequently received from the logic 202 are stored in the cache line 224, and vice versa). In embodiments, a single data unit is written from the logic 202 to the cache memory 207 during a clock cycle. Thus, in the example of FIG. 2C where each of the cache lines 222, 224 can store a maximum of four data units, it takes four clock cycles to fill one of the cache lines 222, 224.

Figure 2D:
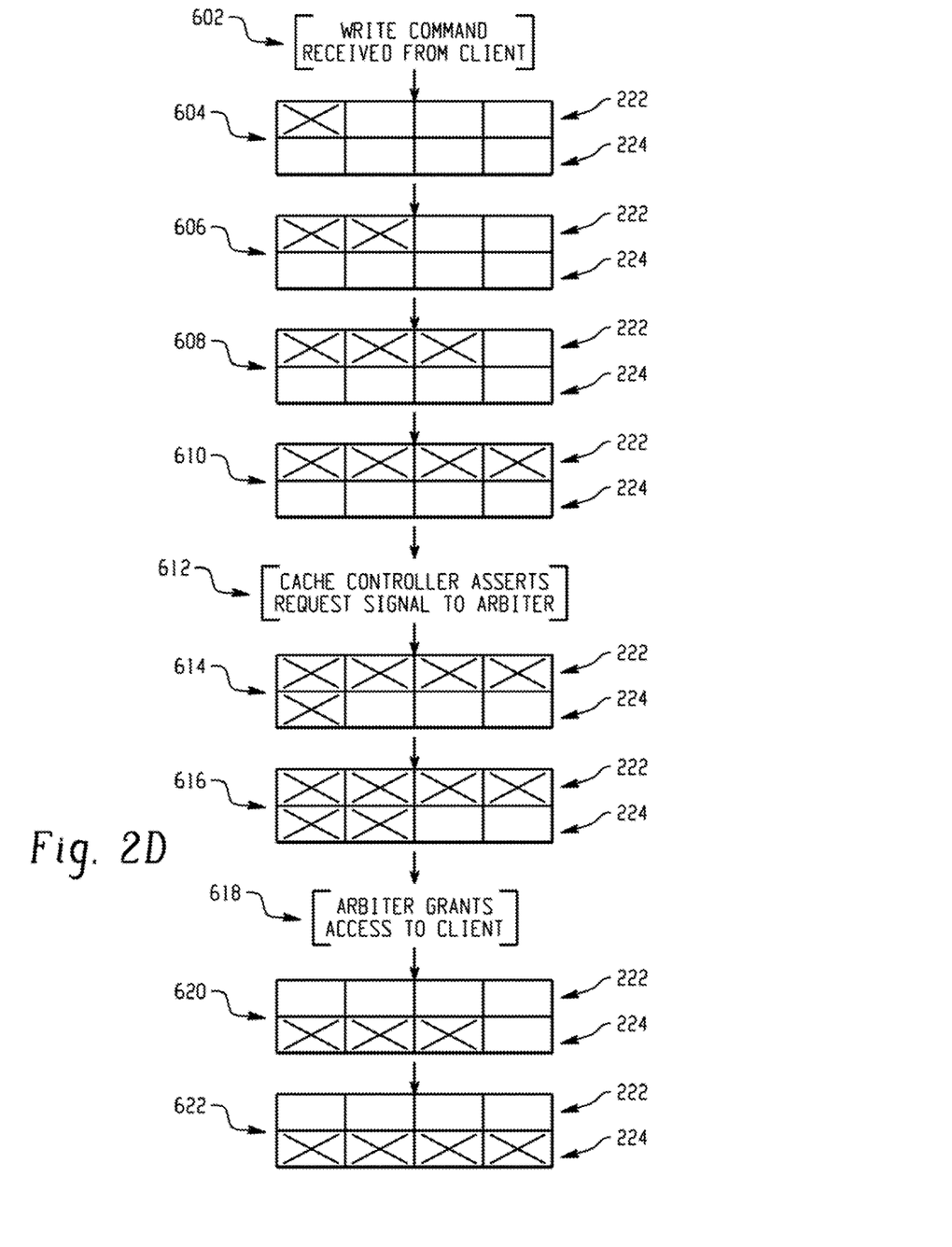
FIGS. 2D and 2E illustrate states of cache lines in write and read operations, respectively, according to some embodiments.

To illustrate an example state of the cache lines 222, 224 during a write operation, reference is made to FIG. 2D. At step 602, a write command is received at the logic 202 from the client 104. Data units that the client 104 wishes to write to its queue 237 are written to the cache line 222 in the example of FIG. 2D. Thus, steps 604, 606, 608, 610 illustrate the logic 202 writing such data units to the cache line 222, with the writing of each data unit taking one clock cycle.

When N data units have been stored in the cache line 222 (i.e., the cache line 222 becomes full), the cache controller 208 asserts a request signal on behalf of the client 104 to which the cache controller 208 corresponds. This is shown in FIG. 2D at step 612, with the cache controller 208 asserting the request signal when the cache line 222 becomes full. The cache controller 208 is thus configured, in embodiments, to maintain a count of a number of data units stored in the cache lines 222, 224 and to assert a request signal when one of the cache lines 222, 224 becomes full. The request signal is received by the arbiter 108. When the arbiter 108 grants access to the client 104, the N data units stored in the cache line 222 can be written to the client's queue 237 formed in the memory 110. Thus, in the example of FIG. 2D, when the arbiter grants access to the client 104, the N data units stored in the cache line 222 can be written to the client's FIFO queue 237 formed in the memory 110. As described above, the arbiter 108 grants access to the memory 110 to the clients 104 having request signals asserted in a sequential order (e.g., according to a "round robin" scheme). In granting access to the clients 104 having request signals asserted in the sequential order, the arbiter 108 grants each client access to the memory 110 for only a single clock cycle at a time, thus ensuring that each client 104 requesting access to the memory 110 is granted access at least once every N clock cycles, where N is equal to the number of clients 104, as described above.

While the client 104 is waiting to be served by the arbiter 108, the logic 202 of the controller 106 is configured to write other data units from the client 104 to a second cache line of the cache memory 207. Thus, for example, with reference to FIG. 2D, while the client 104 is waiting to be served by the arbiter 108, the logic 202 writes other data units from the client 104 to the cache line 224. The writing of such other data units is in response to a write command received from the client 104, in embodiments. Thus, steps 614, 616 illustrate the logic 202 writing these data units to the cache line 224, with the writing of each data unit taking one clock cycle. As shown in the steps 614, 616, the cache line 222 continues to be full (i.e., storing N data units) because the client 104 has not yet been served by the arbiter 108.

Continuing the above example, when the arbiter 108 grants the write access to the client 104 at the step 618 of FIG. 2D, the controller 106 is configured to push the N data units from the first cache line 222 onto the client's FIFO queue 237. This is shown in step 620 of FIG. 2D, which illustrates that the cache line 222 is empty after the controller 106 pushes the N data units from the cache line 222 onto the client's FIFO queue 237. The pushing of the N data units onto the queue 237 is accomplished during the single clock cycle that the client 104 is granted access to the memory 110. As shown in FIG. 2A, each memory line 238 of the FIFO queue 237 is configured to store a maximum of N data units. Thus, when the arbiter 108 grants the write access to the client 104, the controller 106 pushes the N data units from the first cache line 222 onto a single memory line 238 of the client's FIFO queue 237. The address of the single memory line 238 onto which the N data units are pushed is determined by the logic 202 based on the write pointer 242 that is maintained by the logic 202.

As described above, the second cache line 224 is being filled with data units while the client 104 is waiting to be served by the arbiter 108, with the logic 202 being configured to write one data unit to the cache line 224 every clock cycle. Because each of the cache lines 222, 224, 226, 228 of the cache memory 207 can store a maximum of N data units, it is guaranteed that the N data units of the first cache line 222 are pushed to the client's queue 237 before the second cache line 224 becomes full. In other words, because each client 104 requesting access to the memory 110 is granted access at least once every N clock cycles, where N is the number of clients 104, and the writing of the data units into the second cache line 224 takes at least N clock cycles, this guarantees that the data units of the first cache line 222 are pushed to the client's queue 237 prior to the filling of the second cache line 224.

This is illustrated in the example of FIG. 2D. In this example, after the request signal is asserted at the step 612, the arbiter 108 grants access to the client 104 after two clock cycles (e.g., represented by the steps 614, 616, during which first and second data units are written to the cache line 224, as described above). After the client is granted access at the step 618, the logic 202 continues to write data units to the cache line 224, as shown in steps 620, 622. As can be seen, the N data units of the cache line 222 are pushed to the client's FIFO queue 237 and removed from the cache line 222 prior to the filling of the cache line 224. In this example where the client 104 is served by the arbiter 108 after two clock cycles, three of the four clients are requesting access to the memory 110. It is noted, however, that even in instances where all four clients are simultaneously requesting access to the memory 110, it is still guaranteed that the N data units of the cache line 222 are pushed to the client's queue 237 prior to the filling of the cache line 224.

Figure 3:
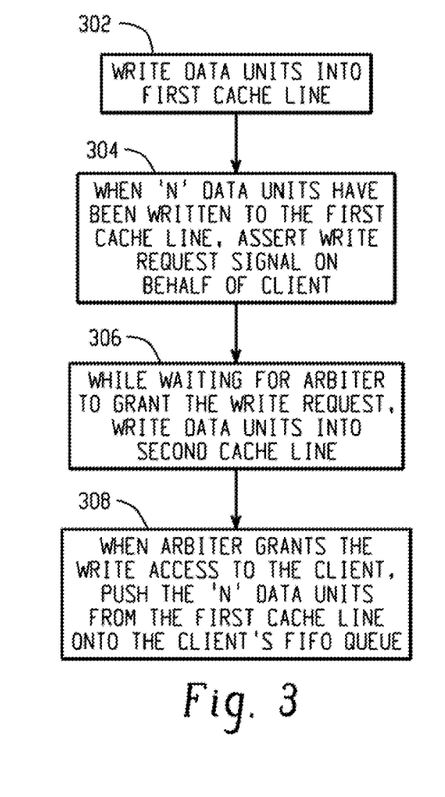
FIG. 3 is a flowchart depicting steps of an example write procedure, according to an embodiment.

FIG. 3 is a flowchart depicting steps of an example write procedure, according to an embodiment. In the example write procedure, data units from a client are written to a FIFO queue that is formed in a portion of a shared memory that is allocated to the client. At 302, data units from the client are written into a first cache line (e.g., cache line 222) of a cache (e.g., cache memory 207) that is allocated to the client. At 304, when N data units have been written to the first cache line, a request signal (e.g., a write request signal) is asserted on behalf of the client. The request signal requests write access to the client's FIFO queue and is received by an arbiter (e.g., arbiter 108). At 306, while waiting for the arbiter to grant the write access to the client, data units from the client are written into a second cache line (e.g., cache line 224) of the cache that is allocated to the client. The writing of each of these data units takes one clock cycle, in embodiments. At 308, when the arbiter grants the write access to the client, the N data units stored in the first cache line are pushed onto the client's FIFO queue. In embodiments, the arbiter grants the client write access for a single clock cycle, and the pushing of these N data units is performed during the single clock cycle.

The preceding paragraphs describe systems and methods for performing write procedures, according to some embodiments. Below, corresponding read procedures are described. Under the approaches of the instant disclosure, a shared memory 110 includes multiple portions 112, with each of the portions 112 being allocated to a respective client of the N clients 104. In embodiments, each of the portions 112 includes a FIFO queue 237 for a respective client of the clients 104, with each FIFO queue 237 comprising a plurality of memory lines 238 for queuing data units in a predetermined order. The example read procedures described below enable a client 104 to read data units from its respective queue 237. The arbiter 108 manages clients' read access to the shared memory 110 in a manner similar to its management of the clients' write access to the memory 110.

When a client 104 wishes to read data units from the queue 237 formed in the portion 112 of the memory 110 allocated to the client 104, the client 104 transmits a read command to the controller 106. The read command is received at the controller's logic 202, as depicted in FIG. 2B. After receiving the read command, the logic 202 determines a read address in the memory 110 from which data units should be read. In examples, the logic 202 determines the read address based on a read pointer (e.g., an output pointer) that is maintained (e.g., stored) by the logic 202, where the read pointer comprises an address of the memory 110. In embodiments, the read pointer points to a memory address corresponding to a specific memory line of the client's queue 237. An example read pointer 240 maintained by the logic 202 is shown in FIG. 2A. As seen in this figure, the read pointer 240 points to a particular memory line 238 of the client's queue 237. The logic 202 stores this read pointer 240 (e.g., in a register, memory, or other storage device of the logic 202), and after data units from a given memory line 238 of the queue have been popped (e.g., removed from the queue 237 as part of a read operation, such that the memory line 238 is empty), the logic 202 increments the read pointer 240 to a next memory line 238 of the queue 237. In this manner, the logic 202 maintains an up-to-date read pointer 240 to the queue 237 at all times, thus enabling the logic 202 to determine a read address for reading data units from the queue 237 after receiving the read command from the client 104.

In embodiments, in addition to maintaining the read pointer 240 and the write pointer 242, the logic 202 also maintains a fill level for the client's FIFO queue 237. As noted above, each of the read and write pointers 240, 242 comprises an address of the memory 110. In embodiments, the fill level is determined by subtracting the memory address of the read pointer 240 from the memory address of the write pointer 242 (i.e., the fill level can be determined based on (address of write pointer 242) minus (address of read pointer 240)). Thus, for instance, if two memory lines of the client's FIFO queue 237 have been filled with data units, but no read operations have been performed, the write pointer 242 will have an address that is two memory lines advanced from that of the read pointer 240, such that subtracting the memory address of the read pointer 240 from the memory address of the write pointer 242 can be used in determining the fill level of the FIFO queue 237.

In some embodiments, the logic 202 has knowledge of a maximum capacity of the client's FIFO queue 237 (e.g., based on this value being programmed into the logic 202, based on the logic 202 or another component of the controller 106 determining this value based on the memory size given to the client 104, etc.), such that the logic 202 can determine if the client's FIFO queue 237 is full based on the determined fill level of the queue 237. In these embodiments, if the client 104 transmits a write command to the logic 202 but the client's FIFO queue 237 is full (i.e., the fill level of the queue 237 is equal to the queue's maximum capacity), the logic 202 transmits a response to the client 104 indicating that the queue 237 is full and that the write cannot be completed until data is read out of the queue 237. Likewise, if the client 104 transmits a read command to the logic 202 but the client's FIFO queue 237 is empty (i.e., the fill level of the queue 237 is equal to zero), the logic 202 transmits a response to the client 104 indicating that the queue 237 is empty and that the read cannot be completed.

With reference again to FIG. 2B, after the logic 202 determines the read address, the logic 202 transmits the read address to the cache unit 206. The cache unit 206 includes the cache memory 207 and the cache controller 208, as described above. The cache memory 207 includes multiple cache lines, with the cache lines 226, 228 being allocated for read operations. The logic 202 is configured to read data units from one of the cache lines 226, 228 that stores N data units and return these data units to the client 104. In embodiments, a single data unit is read from the cache memory 207 during a clock cycle. Thus, in the example of FIG. 2C where each of the cache lines 226, 228 can store a maximum of four data units, it takes four clock cycles to read all data units from one of the cache lines 226, 228. Each data unit is removed from the cache line after the data unit is read by the logic 202.

Figure 2E:
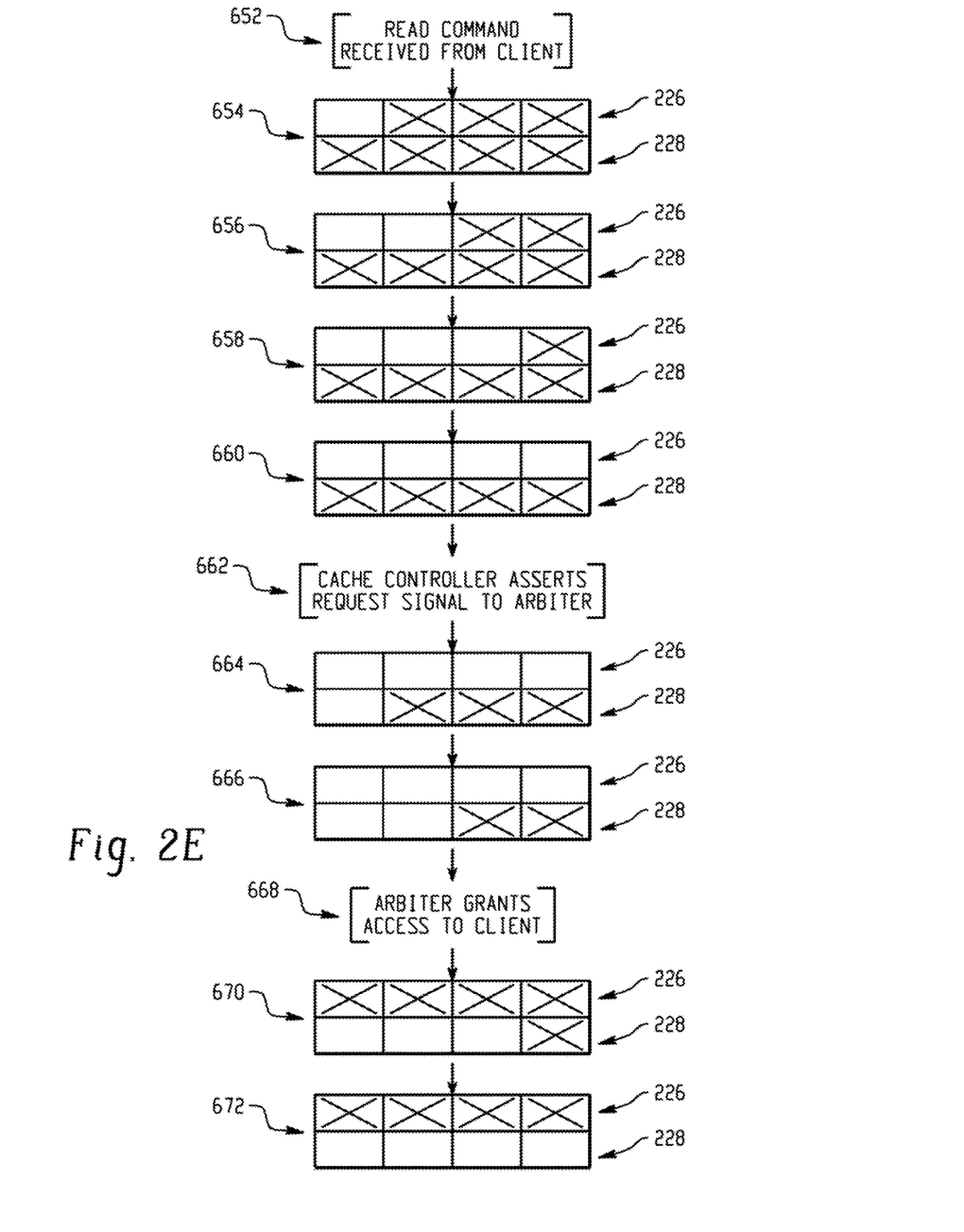

To illustrate an example state of the cache lines 226, 228 during a read operation, reference is made to FIG. 2E. At step 652, a read command is received at the logic 202 from the client 104, with the read command requesting to read data units from the client's queue 237 formed in the memory 110. If the cache lines 226, 228 are full at the time of the client's read command, it may be necessary for the client 104 to first read data units stored in one of the cache lines 226, 228 (e.g., in order to free up space in the cache) before the data units can be read from the client's queue 237. Thus, steps 654, 656, 658, 660 illustrate the logic 202 reading such data units from the cache line 226, with the reading of each data unit taking one clock cycle. Each data unit is removed from the cache line 226 after it is read by the logic 202.

It is noted that in embodiments, the data units stored in the cache lines 226, 228 at the step 654 are a result of previous read commands issued by the client 104. For instance, the data units stored in the cache line 226 may be data units popped from a first memory line of the client's queue 237 in response to a first read command issued by the client 104, and the data units stored in the cache line 228 may be data units popped from a second memory line of the client's queue 237 in response to a second read command issued by the client 104. The cache lines 226, 228 are used in transferring data between the client's FIFO queue 237 and the client 104, and thus, the data units stored in the cache lines 226, 228 at the step 654 may be data units that the client 104 has requested from the queue 237 but that have not yet been returned to the client 104.

When N data units have been removed from the cache line 226 (i.e., when the cache line 226 becomes empty), the cache controller 208 asserts a request signal on behalf of the client 104 to which the cache controller 208 corresponds. This is shown in FIG. 2E at step 662, with the cache controller 208 asserting the request signal when the cache line 226 becomes empty. The cache controller 208 is thus configured, in embodiments, to maintain a count of a number of data units stored in the cache lines 226, 228 and to assert a request signal when one of the cache lines 226, 228 becomes empty. The request signal is received by the arbiter 108. When the arbiter 108 grants access to the client 104, N data units stored in a memory line of the client's queue 237 can be read from the queue 237 and stored in the cache line 226. As described above, the arbiter 108 grants access to the memory 110 to the clients 104 having request signals asserted in a sequential order, such that each client 104 requesting access to the memory 110 is granted access at least once every N clock cycles, where N is equal to the number of clients 104.

While the client 104 is waiting to be served by the arbiter 108, the logic 202 of the controller 106 is configured to read other data units from a second cache line of the cache memory 207 and return these other data units to the client 104. Thus, for example, with reference to FIG. 2E, while the client 104 is waiting to be served by the arbiter 108, the logic 202 reads the data units from the cache line 228 and returns these data units to the client 104. Thus, steps 664, 666 illustrate the logic 202 reading these data units from the cache line 228, with the reading of each data unit taking one clock cycle. As shown in the steps 664, 666, the cache line 226 continues to be empty because the client 104 has not yet been given access by the arbiter 108.

Continuing the above example, when the arbiter 108 grants the read access to the client 104 at step 668 of FIG. 2E, the controller 106 is configured to pop N data units from a memory line of the client's FIFO queue 237, with the popped data units being stored in the first cache line 226. This is shown in step 670 of FIG. 2E, which illustrates that the cache line 226 is full after the controller 106 pops the N data units from the FIFO queue 237 and stores these data units in the cache line 226. The popping of the N data units from the queue 237 is accomplished during the single clock cycle that the client 104 is granted access to the memory 110. As shown in FIG. 2A, each memory line 238 of the FIFO queue 237 is configured to store a maximum of N data units. Thus, when the arbiter 108 grants the read access to the client 104, the controller 106 pops the N data units from a single memory line 238 of the client's FIFO queue 237 and stores the popped data units in the first cache line 226. The address of the single memory line 238 from which the N data units are popped is determined by the logic 202, based on the read pointer 240 that is maintained by the logic 202.

As described above, the logic 202 reads data units from the second cache line 228 while the client 104 is waiting to be served by the arbiter 108, with the logic 202 being configured to read one data unit from the cache line 228 every clock cycle. Each data unit is removed from the cache line 228 after it is read by the logic 202, as described above. Because each of the cache lines 222, 224, 226, 228 of the cache memory 207 can store a maximum of N data units, it is guaranteed that the N data units are popped from the client's queue 237 and stored to the first cache line 226 before the second cache line 228 becomes empty. In other words, because each client 104 requesting access to the memory 110 is granted access at least once every N clock cycles, where N is the number of clients 104, and the reading of the data units from the second cache line 228 takes at least N clock cycles, this guarantees that the N data units are popped from the client's queue 237 and stored to the first cache line 226 prior to the emptying of the second cache line 228.

This is illustrated in the example of FIG. 2E. In this example, after the request signal is asserted at the step 662, the arbiter 108 grants access to the client 104 after two clock cycles (e.g., represented by the steps 664, 666, during which first and second data units are read from the cache line 228, as described above). After the client 104 is granted access at the step 668, the logic 202 continues to read data units from the cache line 228, as shown in steps 670, 672. As can be seen, the N data units are popped from the client's FIFO queue 237 and stored in the cache line 226 prior to the emptying of the cache line 228. In this example where the client 104 is granted access by the arbiter 108 after two clock cycles, three of the four clients 104 are requesting access to the memory 110. It is noted, however that even in instances where all four clients 104 are simultaneously requesting access to the memory 110, it is still guaranteed that the N data units are popped from the queue 237 and stored to the cache line 226 prior to the emptying of the cache line 228.

In some embodiments, the cache units 206 are not utilized. The cache units 206 are not used, for instance, in low-bandwidth applications. In applications where only one client of the clients 104 triggers a read or write transaction in a given clock cycle and the memory 110 is a single-port memory, such applications may be characterized as low-bandwidth applications. Likewise, in applications where there is no more than one write transaction and one read transaction (e.g., from two different clients or from the same client) in a given clock cycle and the memory 110 is a dual-port memory, such applications may be characterized as low-bandwidth applications. For example, a system which serves low speed ports may be characterized as a low-bandwidth application. Thus, for instance, for four clients, each client having a 1 Gbps port, each client sends write commands at a rate of 1 write command every 20 clock cycles (or slower). In such a system, there is no need for a cache because the four clients' total write bandwidth is smaller than the memory's write bandwidth.

Figure 4:
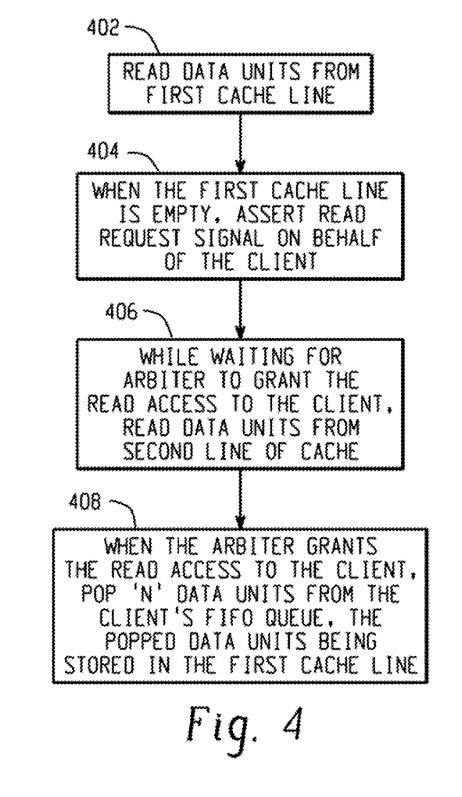
FIG. 4 is a flowchart depicting steps of an example read procedure, according to an embodiment.

FIG. 4 is a flowchart depicting steps of an example read procedure, according to an embodiment. In the example read procedure, data units stored on a FIFO queue formed in a portion of a shared memory allocated to a client are read from the queue and returned to the client. At 402, data units are read from a first cache line (e.g., cache line 226) of a cache (e.g., cache memory 207) that is allocated to the client and returned to the client. In embodiments, each data unit is removed from the first cache line after it is read. At 404, when the first cache line is empty, a request signal (e.g., a read request signal) is asserted on behalf of the client. The request signal requests read access to the client's FIFO queue and is received by an arbiter (e.g., arbiter 108). At 406, while waiting for the arbiter to grant the read access to the client, data units are read from a second cache line (e.g., cache line 228) of the cache that is allocated to the client and returned to the client. The reading of each of these data units takes one clock cycle, and each data unit is removed from the second cache line after it is read. At 408, when the arbiter grants the read access to the client, N data units are popped from a memory line of the client's FIFO queue and stored in the first cache line. In embodiments, arbiter grants the read access for a single clock cycle, and the popping of the N data units is performed during the single clock cycle.

In embodiments described herein, a memory is shared by a plurality of N clients, with the memory having a single memory space for holding a plurality of data storage arrays that are respectively configured to store data in a FIFO manner for corresponding clients among the N clients. An arbiter is configured to manage the clients' access to their respective data storage arrays, as described herein. To enable the clients to efficiently read and write data to their respective data storage arrays, a plurality of caches are used for transferring data between the N clients and the plurality of data storage arrays. In embodiments, each of the caches corresponds to a respective client of the N clients. Further, in embodiments, each of the caches includes multiple cache lines (e.g., two cache lines for write operations and two cache lines for read operations), where the cache lines are dimensioned to have a width that is equal to that of the memory space. In examples, a width of the memory space and the cache lines corresponds to the number of clients N multiplied by a width of data to be stored in the data storage arrays. Thus, for instance, a width of the memory space and the cache lines may be equal to N*data_word_size, where "data_word_size" is a size of a data unit (i.e., data word) utilized by the clients.

The plurality of caches, dimensioned as described above, enable the clients to write data to their respective storage arrays in a manner such that the clients do not perceive that they are sharing the memory. Specifically, data from a given client is written to one of the cache lines of the cache that corresponds to the given client. When the cache line becomes full with N data words, the cache asserts a request to the arbiter. As described herein, the arbiter serves each client that has a request asserted at a minimum rate of 1 service every N clock cycles. While the client is waiting to be served by the arbiter, data from the client is written to another cache line of the cache that corresponds to the client. Since each cache line can store a maximum of N data words, it is guaranteed that the first cache line will be written to the client's data storage array in the memory before the second cache line is full. This is described in detail above with reference to FIG. 2D.

It is thus noted that the client seeking to write data to its data storage array (e.g., queue) in memory need not stop and "wait" while the client is waiting to be served by the arbiter. Rather, through the use of the cache, dimensioned as described above, the client is able to continue writing data to the second cache line for eventual storage in the client's data storage array in the memory, despite the fact that the client is waiting to be served by the arbiter. In this manner, the client is able to write data (e.g., to its cache, for eventual storage of the data in the client's data storage array in the memory) in a continuous or near-continuous manner, such that the client does not perceive that is sharing the memory space with other clients. In other words, the client may effectively operate as if it has full access to the memory at all times, e.g., by writing data to its cache, with such data eventually being pushed to the client's data storage array formed in the memory.

The plurality of caches, dimensioned as described above, likewise enable the clients to read data from their respective storage arrays in a manner such that the clients do not perceive that they are sharing the memory. Specifically, a given client reads data from one of the cache lines of the cache that corresponds to the given client. When the cache line becomes empty, the cache asserts a request to the arbiter. As described herein, the arbiter serves each client that has a request asserted at a minimum rate of 1 service every N clock cycles. While the client is waiting to be served by the arbiter, the client reads data from another cache line of the cache that corresponds to the client. It is thus noted that the client seeking to read data from its data storage array (e.g., queue) in memory need not stop and "wait" while the client is waiting to be served by the arbiter. Rather, through the use of the cache, dimensioned as described above, the client is able to continue reading data from the second cache line, despite the fact that the client is waiting to be served by the arbiter. In this manner, the client is able to read data from its cache in a continuous or near-continuous manner, such that the client does not perceive that is sharing the memory space with other clients. In other words, the client may effectively operate as if it has full access to the memory at all times, e.g., by reading data from its cache, as described above.

Figure 5:
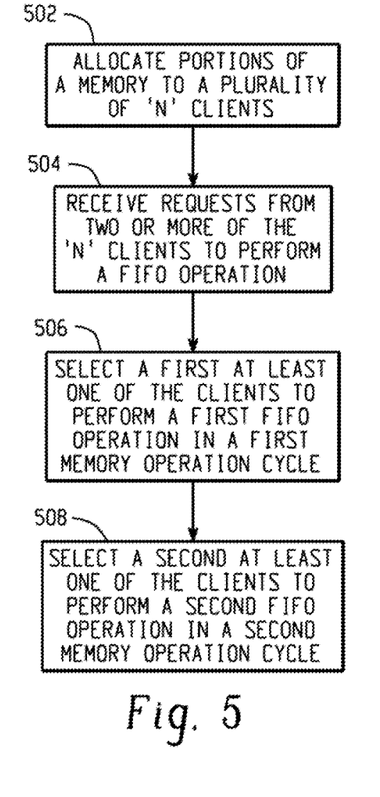
FIG. 5 is a flowchart depicting steps of an example method for providing access to a memory shared by multiple clients, according to an embodiment.

FIG. 5 is a flowchart depicting steps of an example method for providing access to a memory shared by multiple clients, according to an embodiment. At 502, portions of a single memory are allocated to a plurality of N clients. Ones of the portions include a data storage array formed therein, the data storage arrays being respectively configured to store data in a first-in-first-out manner for corresponding clients among the N clients. A number of ports of the single memory is less than the N number of clients sharing the memory. At 504, requests are received from two or more of the N clients to perform a FIFO operation to push data into a corresponding storage array or to pop data from the corresponding storage array. At 506, a first at least one of the clients is selected to perform a first FIFO operation in a first memory operation cycle. At 508, a second at least one of the clients is selected to perform a second FIFO operation in a second memory operation cycle subsequent to the first memory operation cycle.

This application uses examples to illustrate the invention. The patentable scope of the invention may include other examples.

What is claimed is:

1. A First-In-First-Out (FIFO) shared memory system comprising:
   a plurality of A clients, ones of the N clients requiring access to a FIFO buffer;
   a memory shared by the N clients, the memory having a single memory space for holding a plurality of data storage arrays, wherein ones of the N data storage arrays correspond with respective ones of the N clients for storing data in a first-in-first-out manner for the respective ones of the N clients, wherein a number of ports of the memory is less than the N number of clients sharing the memory;
   a plurality of caches, ones of the caches corresponding to ones of the plurality of N clients and having multiple cache lines; and
   an arbiter configured to:
     receive memory access requests corresponding to two or more of the N clients to perform a FIFO operation, wherein to perform the FIFO operation corresponding to a client of the two or more of the N clients, either pushes data from a cache corresponding to the client into a corresponding data storage array or pops data from the corresponding data storage array into the cache corresponding to the client; and
     select, responsive to the memory access requests, a first cache corresponding to a first of the two or more of the N clients to perform a first FIFO operation in a first memory operation cycle and to select a second cache corresponding to a second of the two or more of the N clients to perform a second FIFO operation in a second memory operation cycle subsequent to the first memory operation cycle, wherein the arbiter is further configured to select a cache corresponding to an asserted memory request at least once every N memory operation cycles.

2. The FIFO system of claim 1, wherein a width of the memory space corresponds to the number of clients N multiplied by a width of a data unit to be stored in the data storage arrays, further wherein a data unit is a maximum amount of data that is written to a cache line, or read from a cache line, in one memory cycle.

3. The FIFO shared memory system of claim 2, wherein the cache lines are dimensioned to have a width equal to that of the memory space.

4. The FIFO system of claim 3, further comprising:
a plurality of FIFO controllers, ones of the FIFO controllers corresponding to a respective client of the N clients, and ones of the FIFO controllers configured to, responsive to a corresponding client being selected by the arbiter to perform a FIFO operation (i) push data stored in a single cache line of the client's cache into the corresponding client's data storage array, or (ii) pop data from the corresponding client's data storage array, the popped data being stored in a single cache line of the corresponding client's cache after being popped.

5. The FIFO system of claim 4, wherein ones of the plurality of FIFO controllers are configured to dynamically size respective ones of the N data storage arrays.

6. The FIFO shared memory system of claim 1, wherein the plurality of data storage arrays are configured to store a same type of data having a predetermined dimension for ones of the N clients.

7. The FIFO shared memory system of claim 1, further comprising:
a plurality of FIFO controllers configured to control the N clients' access to their corresponding data storage arrays in the single memory, ones of the FIFO controllers corresponding to a respective data storage array of the plurality of data storage arrays.

8. The FIFO shared memory system of claim 7, wherein ones of the FIFO controllers are configured to store a read pointer and a write pointer for a corresponding data storage array, the FIFO controller being further configured to increment (i) the write pointer to a next memory line of the data storage array after pushing data into the data storage array, and (ii) the read pointer to a next memory line of the data storage array after popping data from the data storage array.

9. The FIFO shared memory system of claim 7, wherein ones of the FIFO controllers are configured to define one or more dimensions of a respective corresponding data storage array.

10. The FIFO shared memory system of claim 9, wherein the one or more dimensions comprise a number of memory lines of the data storage array, and wherein the plurality of data storage arrays include arrays having different numbers of memory lines.

11. The FIFO shared memory system of claim 1, wherein the arbiter is configured to select the first at least one of the clients and the second at least one of the clients to perform the respective first and second FIFO operations according to a round robin arbitration scheme.

12. The FIFO shared memory system of claim 1, further comprising:

at least one controller configured to assert request signals on behalf of the N clients, the request signals being asserted in response to memory request commands received from the N clients, wherein the arbiter is configured to select clients having request signals asserted in a sequential order.

13. The FIFO shared memory system of claim 12, wherein the at least one controller includes:
multiple caches, ones of the multiple caches being allocated to a respective client among the N clients and including multiple cache lines, ones of the cache lines being configured to store a maximum of N data units, wherein the data storage arrays respectively comprise one or more memory lines, and wherein the memory lines are configured to store a maximum of N data units, further wherein a data unit is a maximum amount of data that is written to a cache line or read from a cache line in one memory cycle.

14. The FIFO shared memory system of claim 13, wherein ones of the caches include first and second cache lines allocated for write operations, the at least one controller being configured to
write data units from a given client into the first cache line of the cache that is allocated to the given client;
when N data units have been written to the first cache line, assert a request signal on behalf of the given client;
while waiting for the arbiter to select the given client, write data units from the given client into the second cache line of the cache; and
upon the arbiter selecting the given client to be served, push the N data units from the first cache line into the data storage array of the given client.

15. The FIFO shared memory system of claim 13, wherein ones of the caches include respective first and second cache lines allocated for read operations, the at least one controller being configured to
read data units from the first cache line of the cache that is allocated to a given client, the data unit being removed from the first cache line after it is read;
when the first cache line is empty, assert a request signal on behalf of the given client;
while waiting for the arbiter to select the given client among the N clients, read data units from the second cache line of the cache; and
when the arbiter selects the given client, pop N data units from the given client's FIFO queue, the popped data units being stored in the first cache line of the cache.

16. A method for providing access to a memory shared by multiple clients, the method comprising:
allocating ones of N portions of a single shared memory to ones of a plurality of N clients, ones of the N portions including a data storage array formed therein for storing and reading data in a first-in-first-out manner for a single respective client of the N clients to which a respective portion of the N portions is allocated, wherein a number of ports of the single memory is less than the N number of clients sharing the memory;
receiving data corresponding to ones of the plurality of N clients into two or more of a plurality of N caches, ones of the caches corresponding to ones of the plurality of N clients;
receiving requests corresponding to two or more of the N clients to perform a FIFO operation that includes either pushing data from a cache of the ones of caches that correspond to ones of the plurality of the N clients into a storage array of a portion of the N portions allocated to a client of the plurality of N clients or popping data from the storage array corresponding to the client into the cache corresponding to the client; and responsive to the requests received from two or more of the N clients performing FIFO operations corresponding to a client corresponding to received requests once every N memory operation cycle.

17. The method of claim 16, further comprising:

storing, for ones of the data storage arrays respectively, a read pointer and a write pointer;

incrementing a first write pointer associated with a first data storage array of the data storage arrays to a next memory line of the first data storage array after pushing data into the first data storage array; and incrementing a first read pointer associated with the first data storage array to a next memory line of the first data storage array after popping data from the first data storage array.

18. The method of claim 16, wherein the sequentially selecting the two or more of the N clients to perform a FIFO operation is according to a round robin arbitration scheme.

19. The method of claim 16, wherein the requests are asserted on behalf of the two or more of the N clients by at least one controller that includes multiple caches, the method further comprising:

allocating ones of the caches to a respective client of the N clients, wherein ones of the caches include multiple cache lines, wherein the cache lines are configured to store a maximum of N data units, and wherein ones of the data storage arrays comprise one or more memory lines that are respectively configured to store a maximum of N data units, wherein a data unit is a maximum amount of data that is written to a cache line or read from a cache line in one memory cycle.

20. The method of claim 19, wherein ones of the caches include first and second cache lines allocated for write operations, the method further comprising:

writing data units from a given client into the first cache line of the cache that is allocated to the given client;

when N data units have been written to the first cache line, asserting a request signal on behalf of the given client;

while waiting for the arbiter to select the given client, writing data units from the given client into the second cache line of the cache; and upon the arbiter selecting the given client to be served, pushing the N data units from the first cache line into the data storage array of the given client.

21. The method of claim 19, wherein ones of the caches includes first and second cache lines allocated for read operations, the method further comprising:

reading data units from the first cache line of the cache that is allocated to a given client, the data unit being removed from the first cache line after it is read;

when the first cache line is empty, asserting a request signal on behalf of the given client;

while waiting for the arbiter to select the given client among the N clients, reading data units from the second cache line of the cache; and when the arbiter selects the given client, popping N data units from the given client's FIFO queue, the popped data units being stored in the first cache line of the cache.

* * * * *